United States Patent
Hagen et al.

(10) Patent No.: US 12,174,374 B2
(45) Date of Patent: Dec. 24, 2024

(54) PROJECTION ASSEMBLY FOR A HEAD-UP DISPLAY (HUD) WITH P-POLARISED RADIATION

(71) Applicant: SAINT-GOBAIN GLASS FRANCE, Courbevoie (FR)

(72) Inventors: Jan Hagen, Bonn (DE); Klaus Fischer, Alsdorf (DE); Norbert Huhn, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 486 days.

(21) Appl. No.: 17/763,565

(22) PCT Filed: Nov. 3, 2020

(86) PCT No.: PCT/EP2020/080723
§ 371 (c)(1),
(2) Date: Mar. 24, 2022

(87) PCT Pub. No.: WO2021/104800
PCT Pub. Date: Jun. 3, 2021

(65) Prior Publication Data
US 2022/0342217 A1    Oct. 27, 2022

(30) Foreign Application Priority Data
Nov. 28, 2019    (EP) .................................... 19212006

(51) Int. Cl.
*G02B 27/01*    (2006.01)
(52) U.S. Cl.
CPC .................... *G02B 27/0101* (2013.01); *G02B 2027/0194* (2013.01)
(58) Field of Classification Search
CPC .................... G02B 27/0101; G02B 2027/0194
(Continued)

(56) References Cited

U.S. PATENT DOCUMENTS

| 6,979,499 B2 * | 12/2005 | Walck ................ G02B 27/0101 |
| | | 359/359 |
| 2017/0242247 A1 | 8/2017 | Tso et al. |
| 2018/0180923 A9 | 6/2018 | Saenger Nayver et al. |

FOREIGN PATENT DOCUMENTS

| CN | 104267499 A | 1/2015 |
| CN | 104995150 A | 10/2015 |

(Continued)

OTHER PUBLICATIONS

International Search Report as issued in International Patent Application No. PCT/EP2020/080723, dated Jan. 20, 2021.

(Continued)

*Primary Examiner* — Jerry L Brooks
(74) *Attorney, Agent, or Firm* — Pillsbury Winthrop Shaw Pittman LLP

(57) ABSTRACT

A projection assembly for a head-up display (HUD), includes a windshield, including outer and inner panes that are joined to one another via a thermoplastic intermediate layer and having an HUD region; and a projector aimed at the HUD region. The radiation of the projector is predominantly p-polarised, and the windshield is provided with a reflection coating that is suitable for reflecting p-polarised radiation. The reflection coating has exactly one electrically conductive layer based on silver, a lower dielectric layer or layer sequence whose refractive index is at least 1.9 is arranged beneath the electrically conductive layer, an upper dielectric layer or layer sequence whose refractive index is at least 1.9 is arranged above the electrically conductive layer, the ratio of the optical thickness of the upper dielectric layer or layer sequence to the optical thickness of the lower dielectric layer or layer sequence is at least 1.7.

20 Claims, 4 Drawing Sheets

Figure 1:
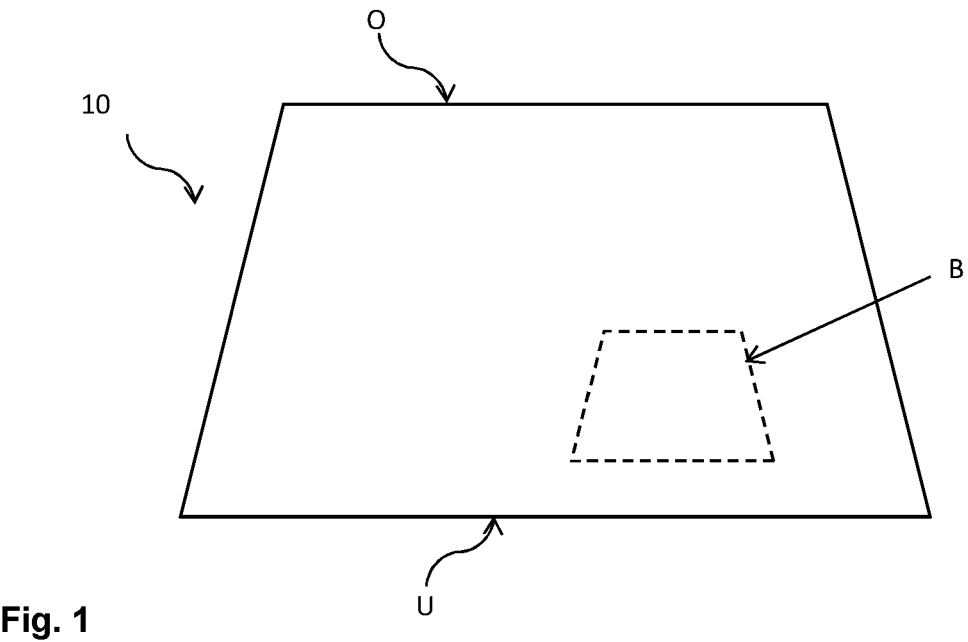

(58) Field of Classification Search
USPC .......................................................... 359/630
See application file for complete search history.

(56) References Cited

FOREIGN PATENT DOCUMENTS

| | | | |
|---|---|---|---|
| CN | 107015369 A | | 8/2017 |
| CN | 111356949 A | | 6/2020 |
| DE | 10 2014 220189 A1 | | 4/2016 |
| EP | 1 880 243 A2 | | 1/2008 |
| EP | 1 800 855 B1 | | 2/2013 |
| JP | 2016-222523 A | | 12/2016 |
| KR | 10-2011-0128282 A | | 11/2011 |
| WO | WO 2006/122305 A2 | | 11/2006 |
| WO | WO 2009/071135 A1 | | 6/2009 |
| WO | WO 2011/114836 A1 | | 9/2011 |
| WO | WO 2019/016548 A1 | | 1/2019 |
| WO | WO 2019/046157 A1 | | 3/2019 |
| WO | WO 2019/179683 A1 | | 9/2019 |

OTHER PUBLICATIONS

"Chapter 5: Deposition and Characterization of Zinc Stannate ($Zn_2SnO_4$) Thin Films," Oct. 4, 2014, Retrieved from the Internet: URL:https://shodhganga.inflibnet.ac.in/bitstream/10603/26313/10/10_chapter%205.pdf, [Retrieved on May 15, 2020], XP055695782, pp. 106-126.
Notice of Attending to Patent Registration as issued in Chinese Patent Application No. 202080004693.5, dated Sep. 27, 2024.

* cited by examiner

PROJECTION ASSEMBLY FOR A HEAD-UP DISPLAY (HUD) WITH P-POLARISED RADIATION

CROSS-REFERENCE TO RELATED APPLICATIONS

This application is the U.S. National Stage of PCT/EP2020/080723, filed Nov. 3, 2020, which in turn claims priority to European patent application number 19212006.1 filed Nov. 28, 2019. The content of these applications are incorporated herein by reference in their entireties.

The invention relates to a projection assembly for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his point of view). Thus, important data can be projected into the drivers field of vision, for example, the current driving speed, navigation or warning messages, which the driver can perceive without having to divert his glance from the road. Head-up displays can thus contribute significantly to an increase in traffic safety.

HUD projectors are predominantly operated with s-polarised radiation and irradiate the windshield with an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarised radiation, which is not significantly reflected by the pane surfaces. Instead, the windshield has a reflection coating as a reflection surface for the p-polarised radiation. DE102014220189A1 discloses such an HUD projection assembly that is operated with p-polarised radiation. Proposed, among other things, as a reflecting structure is a single metallic layer with a thickness of 5 nm to 9 nm, made, for example, of silver or aluminium. WO2019046157A1 also discloses an HUD with p-polarised radiation, wherein a reflection coating with at least two metallic layers is used.

US2017242247A1 discloses another HUD projection assembly with a reflection coating for p-polarised radiation. The reflection coating can contain one or more conductive silver layers, as well as dielectric layers. However, in the relevant spectral range, the reflection spectrum has a significantly curved shape such that the reflectance is relatively strongly wavelength dependent. This is disadvantageous with regard to a colour-neutral display of the HUD projection.

WO2019016548A1 discloses an HUD projection assembly, wherein the windshield is provided with an electrically conductive coating that serves as a sun protection coating or a heatable coating. The coating comprises at least one silver layer, including including a layer of tin zinc oxide with a thickness of 25 nm to 32 nm and including, above that, a layer of tin zinc oxide with a thickness of 75 nm to 85 nm. The coating is not intended to be a reflection coating, but rather to reduce an interfering reflection on the coating by light intensity reducing means (in particular, a further light-absorbing coating), in order to avoid ghost images.

There is a need for projection assemblies for HUDs having reflection coatings that ensure high transmittance in the visible spectral range as well as high reflectivity relative to p-polarised radiation and allow a colour-neutral display. The object of the present invention is to provide such an improved projection assembly.

The object of the present invention is accomplished according to the invention by a projection assembly in accordance with claim 1. Preferred embodiments are disclosed in the dependent claims.

According to the invention, p-polarised radiation is used for generating the HUD image, and the composite pane has a reflection coating that sufficiently reflects p-polarised radiation. Since the angle of incidence of about 65° typical for HUD projection assemblies is relatively close to Brewster's angle for an air/glass transition (56.5°, soda lime glass), the p-polarised radiation is hardly reflected by the pane surfaces, but instead primarily by the conductive coating. Consequently, ghost images do not occur or are hardly perceptible such that the use of an expensive wedge film can be dispensed with. In addition, the HUD image is recognisable even for wearers of polarisation-selective sunglasses, which typically allow only p-polarised radiation to pass through and block s-polarised radiation. The reflection coating according to the invention causes high reflectivity relative to p-polarised radiation in the spectral range from 450 nm to 650 nm, which is relevant for HUD displays (HUD projectors typically operate at wavelengths of 473 nm, 550 nm, and 630 nm (RGB)). This results in a high-intensity HUD image. The single silver layer does not excessively reduce light transmittance such that the pane can still be used as a windshield. The ratio according to the invention of the optical thicknesses of the upper and lower dielectric layer sequence causes a smoothing of the reflective spectrum such that a colour-neutral display is ensured. The advantageous reflection properties, in particular the uniformity of the spectrum, extend even beyond the HUD-relevant spectral range to a spectral range from 400 nm to 680 nm such that in addition to a good HUD display, a positive overall impression of the pane without a disturbing colour cast is achieved. These are major advantages of the present invention.

The projection assembly according to the invention for a head-up display (HUD) includes at least a windshield provided with a reflection coating and a projector (HUD projector). As is usual with HUDs, the projector irradiates a region of the windshield where the radiation is reflected in the direction of the viewer (driver), generating a virtual image, which the viewer perceives, from his point of view, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eye box window". This eye box window can be shifted vertically by adjustment of the mirrors, with the entire area thus available (i.e., the superimposing of all possible eye box windows) referred to as the "eye box". A viewer situated within the eye box can perceive the virtual image. This, of course, means that the eyes of the viewer must be situated within the eye box, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The windshield comprises an outer pane and an inner pane that are joined to one another via a thermoplastic intermediate layer. The windshield is intended, in a window opening, in particular the window opening of a vehicle, to separate the interior from the outside environment. In the context of the invention, the term "inner pane" refers to the pane of the windshield facing the vehicle interior. The term "outer pane" refers to the pane facing the outside environment. The windshield is preferably the windshield of a motor vehicle, in particular of a passenger car or a truck).

The windshield has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the outside environment. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is directed at the HUD region of the windshield. It irradiates the HUD region with radiation in the visible range of the electromagnetic spectrum to generate the HUD projection, in particular in the spectral range from 450 nm to 650 nm, for example, with the wavelengths of 473 nm, 550 nm, and 630 nm (RGB). The radiation of the projector is predominantly p-polarised. The reflection coating is suitable for reflecting p-polarised radiation. As a result, a virtual image which the driver of the vehicle can perceive as behind the windshield from his point of view is generated from the projector radiation.

The projector radiation directed at the windshield is primarily reflected at the reflection coating, i.e., the most intense reflection occurs at the reflection coating. In other words, the intensity of the projector radiation reflected at the reflection coating is higher than the intensity of the radiation reflected at any other interface, in particular, higher than the intensities of the projector radiation reflected at the interior-side surface of the inner pane and the exterior-side surface of the outer pane.

The windshield preferably has no other thin-film coatings other than the reflection coating, in particular no such coatings that reduce the intensity of the projector radiation reflected at the reflection coating.

The reflection coating according to the invention has exactly one electrically conductive layer, based on silver. A lower dielectric layer or layer sequence is arranged beneath the electrically conductive layer. Likewise, an upper dielectric layer or layer sequence is arranged above the electrically conductive layer. The upper and the lower dielectric layer or layer sequence have in each case a refractive index that is at least 1.9.

In the context of the present invention, refractive indices are generally indicated in relation to a wavelengths of 550 nm. The optical thickness is the product of the geometric thickness and the refractive index (at 550 nm). The optical thickness of a layer sequence is calculated as the sum of the optical thicknesses of the individual layers.

In the context of the invention, if a first layer is arranged "above" a second layer, this means that the first layer is arranged farther from the substrate on which the coating is applied than the second layer. In the context of the invention, if a first layer is arranged "beneath" a second layer, this means that the second layer is arranged farther from the substrate than the first layer.

When a layer is based on a material, the layer consists for the most part of this material, in particular substantially of this material in addition to any impurities or dopants.

According to the invention, the ratio of the optical thickness of the upper dielectric layer or layer sequence to the optical thickness of the lower dielectric layer or layer sequence is at least 1.7. It has, surprisingly, been shown that this asymmetry of the optical thicknesses results, on the one hand, in a significantly smoother reflection spectrum relative to p-polarizsed radiation such that there is relatively constant reflectance over the entire relevant spectral range (400 nm to 680 nm). This ensures a colour-neutral display of the HUD projection and a colour-neutral overall impression of the pane.

The ratio of the optical thicknesses according to the invention is calculated as the quotient of the optical thickness of the upper dielectric layer or layer sequence (dividend) divided by the optical thickness of the lower dielectric layer or layer sequence (divisor).

In a preferred embodiment, the ratio of the optical thickness of the upper dielectric layer or layer sequence to the optical thickness of the lower dielectric layer or layer sequence is at least 1.8, particularly preferably at least 1.9. This yields particularly good results.

The reflection coating is preferably applied to one of the surfaces of the two panes facing the intermediate layer, i.e., the interior-side surface of the outer pane or the exterior-side surface of the inner pane. Alternatively, the reflection coating can also be arranged within the thermoplastic intermediate layer, for example, applied to a carrier film that is arranged between two thermoplastic bonding films. The arrangement of the reflection coating on the exterior-side surface of the inner pane is particularly preferred, since the projector radiation then has to travel the shortest possible distance through the windshield until it strikes the reflection coating. This is advantageous in terms of the quality of the HUD image. The reflection coating is transparent, meaning, in the context of the invention, that it has average transmittance in the visible spectral range of at least 70%, preferably at least 80% and thus does not substantially restrict vision through the pane. In principle, it is sufficient for the HUD region of the windshield to be provided with the reflection coating. However, other regions can also be provided with the reflection coating and the windshield can be provided with the reflection coating essentially over its entire surface, which may be preferred for manufacturing reasons. In one embodiment of the invention, at least 80% of the pane surface is provided with the reflection coating according to the invention. In particular, the reflection coating is applied to the pane surface over its entire surface with the exception of a peripheral edge region and, optionally, a local region intended to ensure the transmittance of electromagnetic radiation through the windshield as communication windows, sensor windows, or camera windows, and, consequently, are not provided with the reflection coating. The peripheral uncoated edge region has, for example, a width of up to 20 cm. It prevents direct contact of the reflection coating with the surrounding atmosphere such that the reflection coating is protected, inside the windshield, against corrosion and damage.

The reflection coating according to the invention has IR-reflecting properties due to the electrically conductive silver layer such that it functions as a sun protection coating that reduces the heating of the vehicle interior by reflecting thermal radiation. The reflection coating can also be used as a heating coating when it is electrically contacted such that a current flows through it, heating the reflection coating.

In the spectral range from 400 nm to 680 nm, the windshield provided with the reflection coating preferably has an averaged reflectance relative to p-polarised radiation of at least 15%, particularly preferably of at least 20%. This produces a sufficiently high intensity projection image. The reflectance is measured with an angle of incidence of 65° relative to the interior-side surface normal, which corresponds approx. to the irradiation from conventional projectors. The spectral range from 400 nm to 680 nm was used to characterise the reflection properties because the optical impression of a viewer is primarily shaped by this spectral range. It also covers the relevant wavelengths for the HUD display (RGB: 473 nm, 550 nm, 630 nm). The high reflectance, along with a relatively simple layer structure, is a major advantage of the present invention. Particularly good results are achieved when the reflectance in the entire spectral range from 400 nm to 680 nm is at least 15%, preferably at least 20%, such that the reflectance in the specified spectral range is not below the specified values at any point.

Reflectance describes the proportion of the total incident radiation that is reflected. It is indicated in % (based on 100% incident radiation) or as a unitless number from 0 to 1 (normalised to the incident radiation). Plotted as a function of the wavelength, it forms the reflection spectrum. In the context of the present invention, the statements concerning reflectance relative to p-polarised radiation are based on the reflectance measured with an angle of incidence of 65° relative to the interior-side surface normal. The data regarding the reflectance or the reflection spectrum are based on a reflection measurement with a light source that emits uniformly with a normalised radiation intensity of 100% in the spectral range under consideration.

In order to achieve the most colour-neutral display of the projector image possible, the reflection spectrum should be as smooth as possible and should have no pronounced local minima and maxima. In the spectral range from 400 nm to 680 nm, the difference between the maximally occurring reflectance and the mean of the reflectance as well as the difference between the minimally occurring reflectance and the mean of the reflectance in a preferred embodiment should be at most 3%, particularly preferably at most 2%. Here again, the reflectance relative to p-polarised radiation is measured with an angle of incidence of 65° relative to the interior-side surface normal. The resultant difference is to be considered as the absolute deviation of reflectance (reported in %), not as a percentage deviation relative to the mean. The specified smoothness of the reflection spectrum can easily be achieved with the reflection coating according to the invention due to its electrically conductive layer.

Alternatively, the standard deviation in the spectral range from 400 nm to 680 nm can be used as a measure of the smoothness of the reflection spectrum. It is preferably less than 1%, particularly preferably less than 0.9%, most particularly preferably less than 0.8%.

The above-mentioned desired reflection characteristics are achieved in particular through the choice of the materials and thicknesses of the individual layers as well as the structure of the dielectric layer sequence. The reflection coating can thus be suitably adjusted.

The reflection coating is a thin-layer stack, i.e., a layer sequence of thin individual layers. This thin-layer stack contains exactly one electrically conductive layer, based on silver. The electrically conductive layer based on silver gives the reflection coating the basic reflecting properties and also an IR-reflecting effect and electrical conductivity. The electrically conductive layer based on silver can also be referred to simply as a silver layer. The reflection coating contains exactly one silver layer, i.e., not more than one silver layer, and also no other silver layers are arranged above or beneath the reflection coating. It is a particular advantage of the present invention that the desired reflection properties can be achieved with a silver layer without excessively reducing the transmittance, as would be the case if multiple conductive layers were used. However, it is also possible for other electrically conductive layers that do not substantially contribute to the electrical conductivity of the reflection coating but serve a different purpose to be present. This applies in particular to metallic blocking layers with geometric thicknesses less than 1 nm, which are preferably arranged between the silver layer and the dielectric layer sequences.

The electrically conductive layer is based on silver. The conductive layer preferably contains at least 90 wt.-% silver, particularly preferably at least 99 wt.-% silver, most particularly preferably at least 99.9 wt.-% silver. The silver layer can have dopants, for example, palladium, gold, copper, or aluminium. The geometric layer thickness of the silver layer is preferably at most 15 nm, particularly preferably at most 14 nm, most particularly preferably at most 13 nm. As a result, advantageous reflectivity in the IR range can be achieved, without excessively reducing transmittance. The geometric layer thickness of the silver layer is preferably at least 5 nm, particularly preferably at least 8 nm. Thinner silver layers can lead to dewetting of the layer structure. Particularly preferably, the geometric layer thickness of the silver layer is from 10 nm to 14 nm or from 11 nm to 13 nm.

In an advantageous embodiment, the reflection coating includes no dielectric layers whose refractive index is less than 1.9. In other words, all dielectric layers of the reflection coating have a refractive index of at least 1.9. It is a particular advantage of the present invention that the desired reflection properties can be achieved with relatively high-refractive dielectric layers alone. Since silicon oxide layers that have low deposition rates in magnetic field enhanced cathodic deposition are, in particular, considered for low-refractive layers with a refractive index of less than 1.9, the reflection coating according to the invention can thus be produced quickly and economically.

The reflection coating contains, above and beneath the silver layer, independently of one another in each case, a dielectric layer or a dielectric layer sequence with a refractive index of at least 1.9. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminium, zirconium, titanium, or boron. The dopants can provide inherently dielectric materials with a certain electrical conductivity. The person skilled in the art will nevertheless identify them as dielectric layers in terms of their function, as is usual in the field of thin layers. The material of the dielectric layers preferably has electrical conductivity (reciprocal of specific resistance) of less than $10^{-4}$ S/m. The material of the electrically conductive layers preferably has electrical conductivity greater than $10^4$ S/m.

The optical thickness of the upper dielectric layer or layer sequence is preferably from 100 nm to 200 nm, particularly preferably from 130 nm to 170 nm. The optical thickness of the lower dielectric layer or layer sequence is preferably from 50 nm to 100 nm, particularly preferably from 60 nm to 90 nm. Good results are achieved with this.

In an advantageous embodiment, a dielectric layer, which can be referred to as an antireflection layer and is preferably based on an oxide, for example, tin oxide, and/or a nitride, for example, silicon nitride, particularly preferably based on silicon nitride, is, in each case, arranged above and beneath the silver layer. Silicon nitride has proven to be a good choice due to its optical properties, its easy availability, and its high mechanical and chemical stability. The silicon is preferably doped, for example, with aluminium or boron. In the case of dielectric layer sequences, the silicon nitride based layer is preferably the top layer of the upper layer sequence or the bottom layer of the lower layer sequence. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm.

In addition to the antireflection layer, further dielectric layers with a refractive index of at least 1.9 can optionally be present. Thus, the upper and lower layer sequence can, independently of one another, contain a matching layer to improve the reflectivity of the silver layer. The matching layers are preferably based on zinc oxide, particularly preferably zinc oxide $ZnO_{1-\delta}$ with $0 \leq \delta \leq 0.01$. The matching layers further preferably contain dopants. The matching layers can, for example, contain aluminium-doped zinc oxide (ZnO:Al). The zinc oxide is preferably deposited substoichiometrically relative to the oxygen in order to avoid reaction of excess oxygen with the silver-containing layer. The matching layers are preferably arranged between the silver layer and the antireflection layer. The geometric thickness of the matching layer is preferably from 5 nm to 30 nm, particularly preferably from 8 nm to 12 nm.

Refractive index increasing layers that have a higher refractive index than the antireflection layer can also be present, likewise independently of one another, in the upper and the lower layer sequence. This can further improve and fine-tune the optical properties, in particular the reflection properties. The refractive index increasing layers preferably contain a mixed silicon-metal nitride, such as mixed silicon-zirconium nitride, mixed silicon-aluminium nitride, mixed silicon titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. Alternative materials can be, for example, $WO_3$, $Nb_2O_5$, $Bi_2O_3$, $TiO_2$, $Zr_3N_4$, and/or AlN. The refractive index increasing layers are preferably arranged between the antireflection layer and the silver layering or between the matching layer (if present) and the antireflection layer. The geometric thickness of the refractive index increasing layers is preferably from 5 nm to 30 nm, particularly preferably from 5 nm to 15 nm.

In one embodiment of the invention, exactly one lower dielectric layer with a refractive index of at least 1.9, preferably based on silicon nitride, is arranged beneath the electrically conductive layer. Likewise, exactly one upper dielectric layer with a refractive index of at least 1.9, preferably based on silicon nitride, is arranged above the electrically conductive layer.

This results in the layer sequence starting from the substrate: lower antireflection layer—silver layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm.

In another embodiment of the invention, a first lower dielectric layer (antireflection layer) and a second lower dielectric layer (matching layer) are arranged beneath the electrically conductive layer. Likewise, a first upper dielectric layer (antireflection layer) and a second upper dielectric layer (matching layer) are arranged above the electrically conductive layer. The antireflection and matching layers have a refractive index of at least 1.9. The antireflection layers are preferably based on silicon nitride; the matching layers, based on zinc oxide. The matching layers are preferably arranged between the respective antireflection layer and the is silver layer: This results in the layer sequence starting from the substrate: lower antireflection layer—lower matching layer—silver layer—upper matching layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm.

In another embodiment of the invention, a first lower dielectric layer (antireflection layer), a second lower dielectric layer (matching layer), and a third lower dielectric layer (refractive index increasing layer) are arranged beneath the electrically conductive layer. Likewise, a first upper dielectric layer (antireflection layer), a second upper dielectric layer (matching layer), and a third upper dielectric layer (refractive index increasing layer) are arranged above the electrically conductive layer. The antireflection and matching layers and the refractive index increasing layers have a refractive index of at least 1.9. The refractive index increasing layers have a higher refractive index than the antireflection layers, preferably at least 2.1. The antireflection layers are preferably based on silicon nitride; the matching layers, based on zinc oxide; the refractive index increasing layers, based on a mixed silicon-metal nitride, such as mixed silicon-zirconium nitride or mixed silicon-hafnium nitride. The matching layers preferably have the least distance from the silver layer, while the refractive index increasing layers are arranged between the matching layers and the antireflection layers. This results in the layer sequence starting from the substrate: lower antireflection layer—lower refractive index increasing layer—lower matching layer—silver layer—upper matching layer—upper refractive index increasing layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm. The geometric thickness of the refractive index increasing layers is preferably from 5 nm to 30 nm, particularly preferably from 5 nm to 15 nm.

Since the upper and the lower dielectric layer sequence can be formed independently of one another, combinations of the above described embodiments are also possible, wherein the upper dielectric layer/layer sequence is formed according to one embodiment and the lower dielectric layer/layer sequence is formed according to a different one. This results in the following preferred layer sequences (in each case, starting from the substrate, i.e., the surface on which the reflection coating is deposited:

lower antireflection layer—silver layer—upper antireflection layer lower antireflection layer—silver layer—upper matching layer—upper antireflection layer lower antireflection layer—silver layer—upper matching layer—upper refractive index increasing layer—upper antireflection layer lower antireflection layer—lower matching layer—silver layer—upper antireflection layer lower antireflection layer—lower matching layer—silver layer—upper matching layer—upper antireflection layer lower antireflection layer—lower matching layer—silver layer—upper matching layer—upper refractive index increasing layer—upper antireflection layer lower antireflection layer—lower refractive index increasing layer—lower matching layer—silver layer—upper antireflection layer lower antireflection layer—lower refractive index increasing layer—lower matching layer—silver layer—upper matching layer—upper antireflection layer lower antireflection layer—lower refractive index increasing layer—lower matching layer—silver layer—upper matching layer—upper refractive index increasing layer—upper antireflection layer In an advantageous embodiment, the reflection coating includes at least one metallic blocking layer. The blocking layer can be arranged beneath and/or above the silver layer and preferably makes direct contact with the silver layer. The blocking layer is then positioned between the silver layer and the dielectric layer/layer sequence. The blocking layer serves as oxidation protection for the silver layer in particular during temperature treatments of the coated pane, as typically occur during bending processes. The blocking layer preferably has a geometric thickness less than 1 nm, for example, 0.1 nm to 0.5 nm. The blocking layer is preferably based on titanium or a nickel-chromium alloy. The blocking layer is particularly effective directly above the silver layer, which is why, in a preferred embodiment, the reflection coating has a blocking layer above the silver layer and no blocking layer beneath the silver layer. The silver layer then makes direct contact with the lower dielectric layer (sequence) and makes indirect contact with the upper dielectric layer (sequence) via the blocking layer.

The blocking layer changes the optical properties of the reflection coating only insignificantly and is preferably present in all the embodiments described above. Particularly preferably, the blocking layer is arranged directly above the silver layer, i.e., between silver layer and the upper dielectric layer (sequence), where it is particularly effective. This results in the following preferred layer sequences:

lower antireflection layer—silver layer—blocking layer—upper antireflection layer lower antireflection layer—silver layer—blocking layer—upper matching layer—upper antireflection layer lower antireflection layer—silver layer—blocking layer—upper matching layer—upper refractive index increasing layer—upper antireflection layer lower antireflection layer—lower matching layer—silver layer—blocking layer—upper antireflection layer lower antireflection layer—lower matching layer—silver layer—blocking layer—upper matching layer—upper antireflection layer lower antireflection layer—lower matching layer—silver layer—blocking layer—upper matching layer—upper refractive index increasing layer—upper antireflection layer lower antireflection layer—lower refractive index increasing layer—lower matching layer—silver layer—blocking layer—upper antireflection layer lower antireflection layer—lower refractive index increasing layer—lower matching layer—silver layer—blocking layer—upper matching layer—upper antireflection layer lower antireflection layer—lower refractive index increasing layer—lower matching layer—silver layer—blocking layer—upper matching layer—upper refractive index increasing layer—upper antireflection layer Optionally, in each case, an additional blocking layer can be arranged directly beneath the silver layer, i.e., between the silver layer and the lower dielectric layer (sequence).

The projector is arranged on the interior-side of the windshield and irradiates the windshield via the interior-side surface of the inner pane. It is directed toward the HUD region and irradiates it to generate the HUD projection. According to the invention, the radiation of the projector is predominantly p-polarised, thus has a p-polarised radiation component greater than 50%. The higher the proportion of the p-polarised radiation in the total radiation of the projector, the higher the intensity of the desired projection image and the lower the intensity of the undesired reflections on the surfaces of the windshield. The p-polarised radiation component of the projector is preferably at least 70%, particularly preferably at least 80%, and in particular at least 90%. In a particularly advantageous embodiment, the radiation of the projector is essentially purely p-polarised—the p-polarised radiation component is thus 100% or deviates only insignificantly therefrom. The indication of the polarisation direction is based on the plane of incidence of the radiation on the windshield. The expression "p-polarised radiation" refers to radiation whose electric field oscillates in the plane of incidence. "S-polarised radiation" refers to radiation whose electric field oscillates perpendicular to the plane of incidence. The plane of incidence is generated by the vector of incidence and the surface normal of the windshield in the geometric centre of the irradiated region.

The polarisation, i.e., in particular the proportion of p- and s-polarised radiation, is determined at one point of the HUD region, preferably in the geometric centre of the HUD region. Since windshields are usually curved, thus affecting the plane of incidence of the projector radiation, slightly deviating polarizsation proportions can occur in the remaining regions, which is unavoidable for physical reasons.

The radiation of the projector preferably strikes the windshield with an angle of incidence from 45° to 70°, in particular from 60° to 70°. In an advantageous embodiment, the angle of incidence deviates from Brewster's angle by at most 10°. The p-polarised radiation is then reflected only insignificantly at the surface of the windshield such that no ghost image is generated. The angle of incidence is the angle between the vector of incidence of the projector radiation and the interior-side surface normal (i.e., the surface normal on the interior-side external surface of the windshield) in the geometric centre of the HUD region. Brewster's angle for an air-glass transition in the case of soda lime glass, which is commonly used for window panes, is 56.5°. Ideally, the angle of incidence should be as close as possible to this Brewster's angle. However, angles of incidence of 65°, which are common for HUD projection assemblies, are easily implemented in vehicles, and deviate only slightly from Brewster's angle can, for example, also be used such that the reflection of the p-polarised radiation increases only insignificantly.

Since the reflection of the projector radiation occurs substantially at the reflection coating aid not at the external pane surfaces, it is not necessary to arrange the external pane surfaces at an angle relative to one another in order to avoid ghost images. The external surfaces of the windshield are, consequently, preferably arranged substantially parallel to one another. The thermoplastic intermediate layer is preferably not implemented wedge-like, but, instead, has a substantially constant thickness, in particular even in the vertical course between the upper edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is significantly more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colourless, but also tinted or coloured. In a preferred embodiment, the total transmittance through the windshield (including the reflection coating) is greater than 70%. The term "total transmittance" is based on the process for testing the light permeability of motor vehide windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

In an advantageous embodiment, the outer pane is tinted or coloured. This can reduce the exterior-side reflectivity of the windshield, making the impression of the pane more pleasing for an external viewer. However, in order to ensure the prescribed light transmittance of 70% for windshields (total transmittance), the outer pane should preferably have light transmittance of at least 80%, particularly preferably of at least 85%. The inner pane and the intermediate layer are preferably clear, i.e., not tinted or coloured. For example, green or blue coloured glass can be used as the outer pane.

The windshield is preferably curved in one or a plurality of spatial directions, as is customary for motor vehicle window panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The windshield can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating is preferably applied by physical vapour deposition (PVD) onto a pane surface, particularly preferably by cathodic sputtering ("sputtering"), most particularly preferably by magnetron-enhanced cathodic sputtering ("magnetron sputtering"). The coating is preferably applied before lamination. Instead of applying the reflection coating on a pane surface, it can, in principle, also be provided on a carrier film that is arranged in the intermediate layer.

If the windshield is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention also includes the use of a windshield implemented according to the invention as a projection surface of a projection assembly for a head-up display, wherein a projector whose radiation is predominantly p-polarised is directed toward the HUD region. The above-described preferred embodiments apply mutatis mutandis to the use.

The invention further includes the use of a projection assembly according to the invention as an HUD in a motor vehicle, in particular in a passenger car or a truck.

In the following, the invention is explained in detail with reference to drawings and exemplary embodiments. The drawings are schematic representations and are not true to scale. The drawings in no way restrict the invention.

Figure 2:
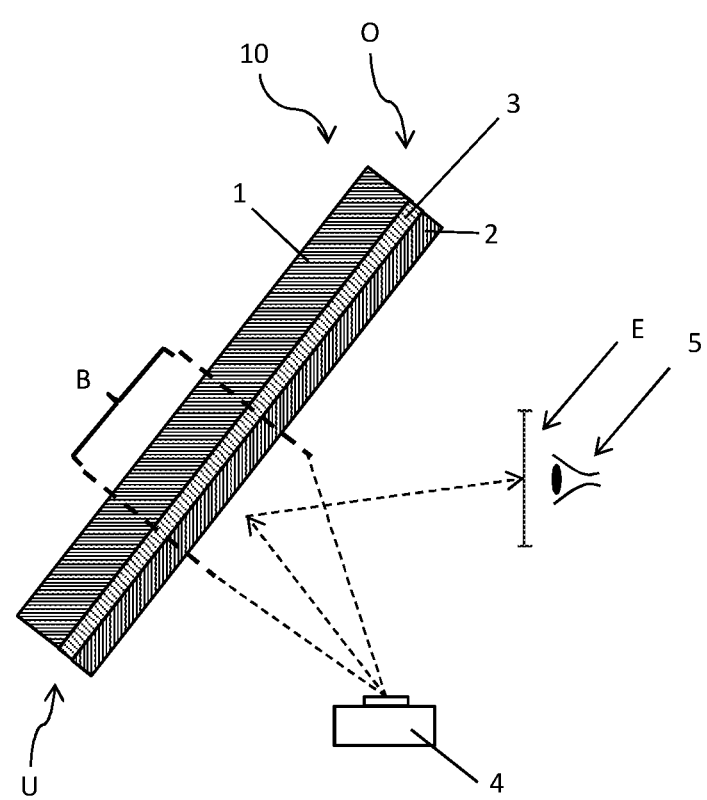
Figure 3:
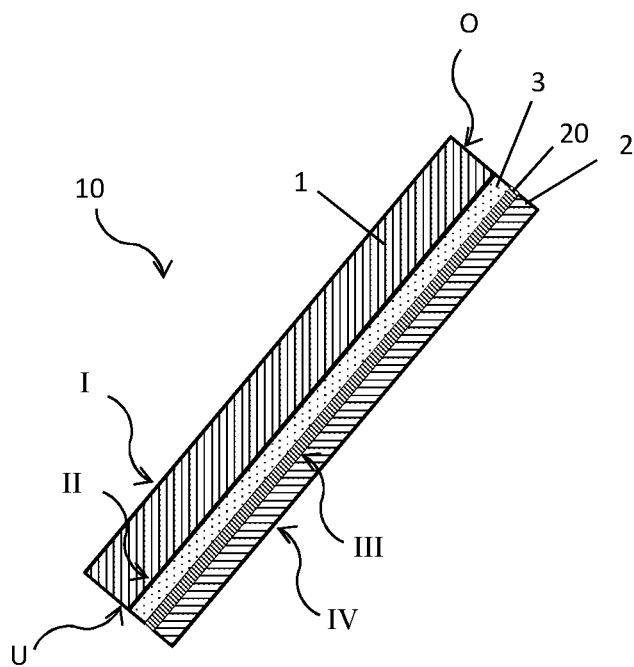
Figure 4:
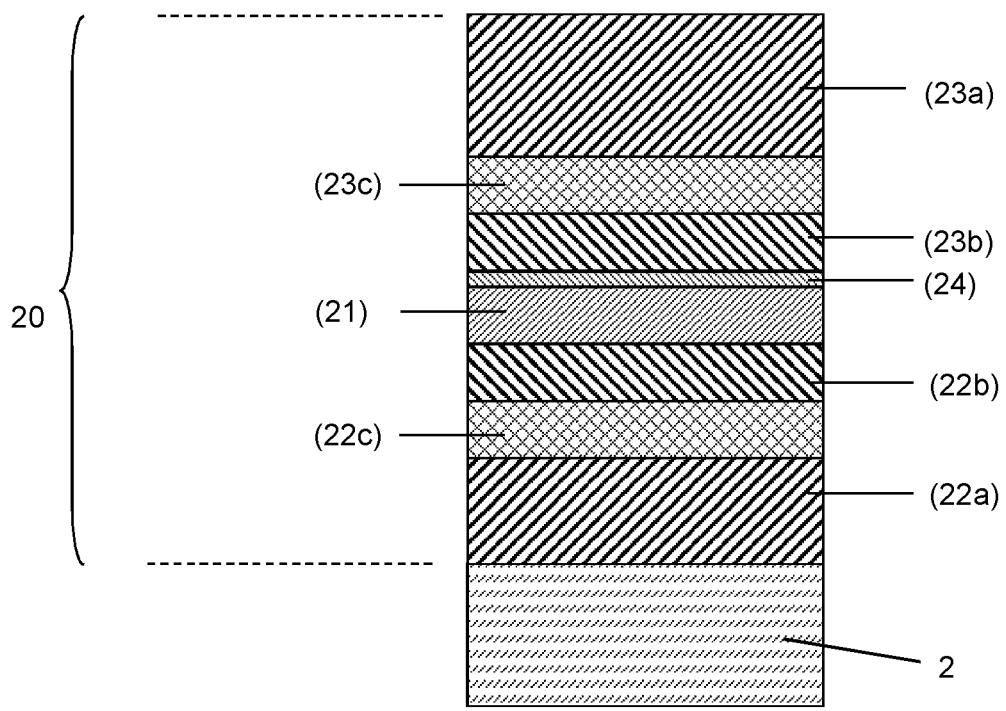
Figure 5:
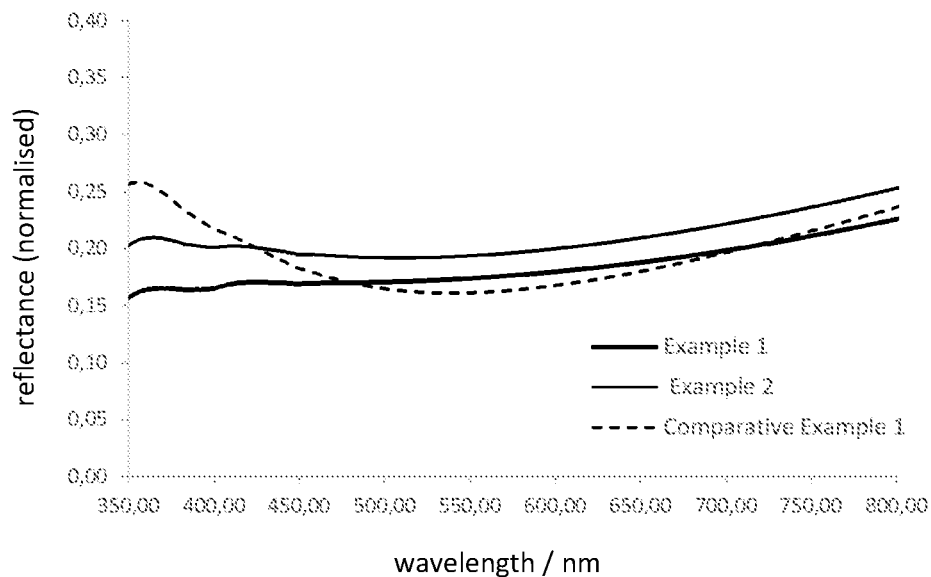
Figure 6:
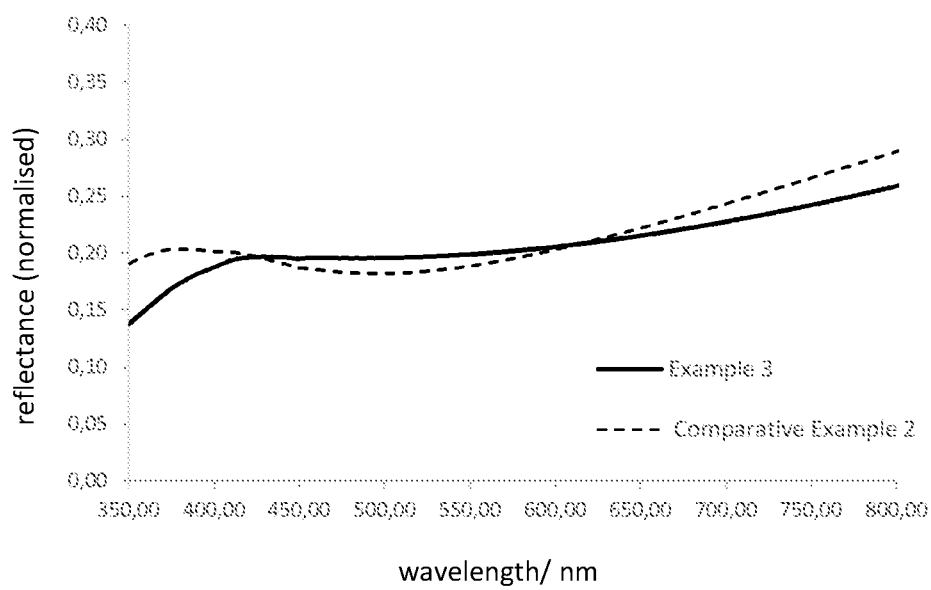
Figure 7:
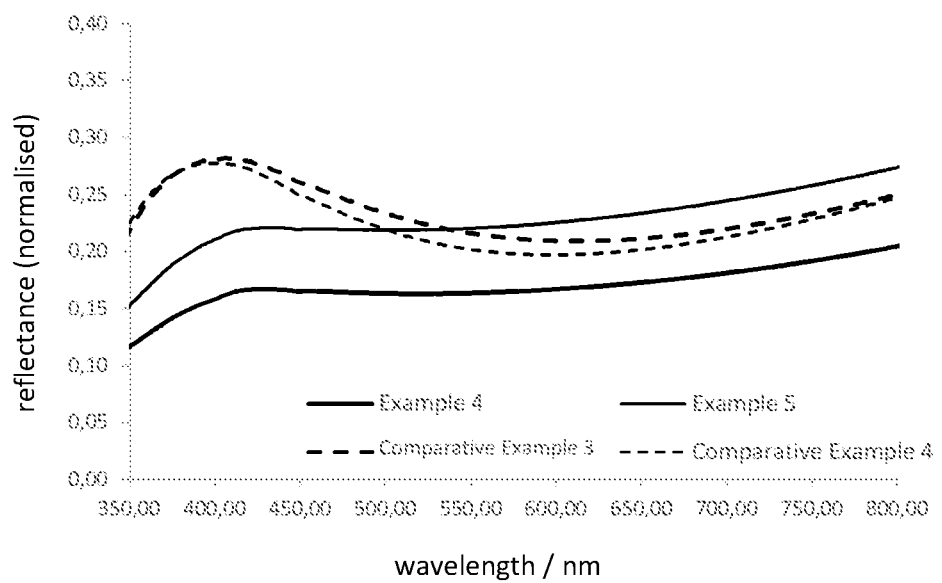

They depict:

FIG. 1 a plan view of a composite pane of a generic projection assembly,

FIG. 2 a cross-section through a generic projection assembly,

FIG. 3 a cross-section through a composite pane of a projection assembly according to the invention, FIG. 4 a cross-section through an embodiment of the reflection coating according to the invention on an inner pane, FIG. 5 reflection spectra of composite panes relative to p-polarised radiation in accordance with Examples 1 and 2 and Comparative Example 1, FIG. 6 reflection spectra of composite panes relative to p-polarised radiation in accordance with Example 3 and Comparative Example 2, and FIG. 7 reflection spectra of composite panes relative to p-polarised radiation in accordance with Examples 4 and 5 and Comparative Examples 3 and 4.

FIG. 1 and FIG. 2 depict in each case a detail of a generic projection assembly for an HUD. The projection assembly comprises a windshield 10, in particular the windshield of a passenger car. The projection assembly also comprises a projector 4 that is directed at a region of the composite pane 10. In this region, usually referred to as HUD region B, the projector 4 can generate images that are perceived by a viewer 5 (vehicle driver) as virtual images on the side of the composite pane 10 facing away from him if his eyes are situated within the so-called eye box E.

The windshield 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the outside environment; the inner pane 2, the vehicle interior.

FIG. 3 depicts an embodiment of a windshield 10 implemented according to the invention. The outer pane 1 has an exterior-side surface I that faces the outside environment in the installed position and an interior-side surface II that faces the interior in the installed position. Likewise, the inner pane 2 has an exterior-side surface III that faces the outside environment in the installed position and an interior-side surface IV that faces the interior in the installed position. The outer pane 1 and the inner pane 2 are made, for example, of soda lime glass. The outer pane 1 has, for example, a thickness of 2.1 mm; the inner pane 2, a thickness of 1.6 mm or 2.1 mm. The intermediate layer 3 is made, for example, of a PVB film with a thickness of 0.76 mm. The PVB film has an essentially constant thickness, apart from any surface roughness common in the art—it is not implemented as a so-called "wedge film".

The exterior-side surface III of the inner pane 2 is provided with a reflection coating 20 according to the invention, which is provided as a reflection surface for the projector radiation (and, possibly, additionally, as an IR reflection coating).

According to the invention, the radiation of the projector 4 is p-polarised, in particular essentially purely p-polarised. Since the projector 4 irradiates the windshield 10 at an angle of incidence of about 65°, which is close to Brewster's angle, the radiation of the projector is only insignificantly reflected at the external surfaces I, IV of the composite pane 10. In contrast, the reflection coating 20 according to the invention is optimised for reflection of p-polarised radiation. It serves as a reflection surface for the radiation of the projector 4 to generate the HUD projection.

FIG. 4 depicts the layer sequence of an embodiment of the reflection coating 20 according to the invention. The reflection coating 20 is a stack of thin layers. The reflection coating 20 comprises an electrically conductive layer 21 based on silver. A metallic blocking layer 24 is arranged directly above the electrically conductive layer 21. Above that, an upper dielectric layer sequence, consisting, from bottom to top, of an upper matching layer 23b, an upper refractive index increasing layer 23c, and an upper antireflection layer 23a, is arranged. Beneath the electrically conductive layer 21, a lower dielectric layer sequence consisting, from top to bottom, of a lower matching layer 22b, a lower refractive index increasing layer 22c, and a lower antireflection layer 22a, is arranged.

The layer structure depicted is intended merely as an example. Thus, the dielectric layer sequences can also include more or fewer layers, provided at least one dielectric layer is present above and beneath the conductive layer 21. The dielectric layer sequences also need not be symmetrical. Exemplary materials and layer thicknesses can be found in the following examples.

The layer sequences of a windshield 10 with the reflection coating 20 on the exterior-side surface III of the inner pane 2 according to Examples 1 through 5 are presented in Table 1, together with the materials and geometric layer thicknesses of the individual layers. Independently of one another, the dielectric layers can be doped, for example, with boron or aluminium.

TABLE 1

| Material | Reference Characters | | Example 1 | Example 2 | Example 3 | Example 4 | Example 5 |
|---|---|---|---|---|---|---|---|
| Soda lime glass | 1 | | 2.1 mm | 2.1 mm | 2.1 mm | 2.1 mm | 2.1 mm |
| PVB | 3 | | 0.76 mm | 0.76 mm | 0.76 mm | 0.76 mm | 0.76 mm |
| SiN | 20 | 23a | 70 nm | 70 nm | 60 nm | 60 nm | 60 nm |
| SiZrN | | 23c | — | — | — | 10 nm | 10 nm |
| ZnO | | 23b | — | — | 10 nm | 10 nm | 10 nm |
| NiCr | | 24 | 0.3 nm | 0.3 nm | 0.3 nm | 0.3 nm | 0.3 nm |
| Ag | | 21 | 11 nm | 12 nm | 12 nm | 11 nm | 13 nm |
| ZnO | | 22b | — | — | 10 nm | 10 nm | 10 nm |
| SiZrN | | 22c | — | — | — | 10 nm | 10 nm |

TABLE 1-continued

| Material | Reference Characters | Layer Thickness | | | | |
|---|---|---|---|---|---|---|
| | | Example 1 | Example 2 | Example 3 | Example 4 | Example 5 |
| SiN | 22a | 30 nm | 35 nm | 25 nm | 20 nm | 20 nm |
| Soda lime glass | 2 | 2.1 mm | 2.1 mm | 2.1 mm | 2.1 mm | 2.1 mm |

For the comparison, Comparative Examples 1 to 4, which do not comply with the features according to the invention, were investigated. Their layer sequences are shown in Table 2.

TABLE 2

| Material | Reference Characters | Layer Thickness | | | |
|---|---|---|---|---|---|
| | | Comparative Example 1 | Comparative Example 2 | Comparative Example 3 | Comparative Example 4 |
| Soda lime glass | 1 | 2.1 mm | 2.1 mm | 2.1 mm | 2.1 mm |
| PVB | 3 | 0.76 mm | 0.76 mm | 0.76 mm | 0.76 mm |
| SiN | 23a | 50 nm | 35 nm | 30 nm | 40 nm |
| SiZrN | 23c | — | — | 10 nm | 10 nm |
| ZnO | 23b | — | 10 nm | 10 nm | 10 nm |
| NiCr | 24 | 0.3 nm | 0.3 nm | 0.3 nm | 0.3 nm |
| Ag | 21 | 12 nm | 13 nm | 13 nm | 13 nm |
| ZnO | 22b | — | 10 nm | 10 nm | 10 nm |
| SiZrN | 22c | — | — | 10 nm | 10 nm |
| SiN | 22a | 50 nm | 35 nm | 50 nm | 40 nm |
| Soda lime glass | 2 | 2.1 mm | 2.1 mm | 2.1 mm | 2.1 mm |

The Examples and the Comparative Examples differ primarily in the ratio of the optical thickness of the upper dielectric layer sequence to the optical thickness of the lower dielectric layer sequence. The optical thickness is the product of the geometric thickness shown in Tables 1 and 2 and the refractive index (SiN: 2.0; SiZrN: 2.2, ZnO: 2.0). The optical thicknesses and their ratio are summarised in Table 3. The ratio φ describes the ratio of the optical thickness of the upper dielectric layer 23a or layer sequence 23a, 23b, and, optionally, 23c to the optical thickness of the lower dielectric layer 22a or layer sequence 22a, 22b, and, optionally, 22c.

TABLE 3

| | Optical Thickness of the Upper Dielectric Layer Sequence | Optical Thickness of the Lower Dielectric Layer Sequence | Ratio φ |
|---|---|---|---|
| Example 1 | 140 | 60 | 2.33 |
| Example 2 | 140 | 70 | 2.00 |
| Example 3 | 140 | 70 | 2.00 |
| Example 4 | 162 | 82 | 1.98 |
| Example 5 | 162 | 82 | 1.98 |
| Comp. Example 1 | 100 | 100 | 1.00 |
| Comp. Example 2 | 90 | 90 | 1.00 |
| Comp. Example 3 | 102 | 142 | 0.72 |
| Comp. Example 4 | 122 | 122 | 1.00 |

FIG. 5, FIG. 6, and FIG. 7 depict reflection spectra of composite pane 10, as in FIG. 3, in each case with a layer structure according to the Examples 1 through 5 of the invention according to Table 1 and according to the Comparative Examples 1 through 4 according to Table 2. The reflection spectra were recorded with a light source that emits p-polarised radiation of uniform intensity in the spectral range observed, when irradiated via the inner pane 2 (the so-called interior-side reflection) at an angle of incidence of 65° relative to the interior-side surface normal. The reflection measurement is thus approximated to the situation in the projection assembly. For the sake of better clarity, in each case the Examples and the Comparative Examples that have a similar layer structure are summarised. FIG. 5 shows Examples 1 and 2 and Comparative Example 1, each of which has only dielectric antireflection layers 22a, 23a FIG. 6 shows Example 3 and Comparative Example 2, each of which has dielectric antireflection layers 22a, 23a and matching layers 22b, 23b. FIG. 7 shows Examples 4 and 5 and Comparative Examples 3 and 4, each of which has dielectric antireflection layers 22a, 23a, matching layers 22b, 23b, and refractive index increasing layers 22c, 23c.

From the graphic representation of the spectra, it is already apparent that the Examples according to the invention having the ratio according to the invention of optical thicknesses of upper and lower dielectric layer or layer sequence result in a substantially smoother spectrum in the spectral range of interest from 400 nm to 680 nm. This ensures a more colour-neutral display of the HUD projection. In addition, the general colour impression of the pane is improved.

The averaged reflectance relative to p-polarised radiation as well as the differences of the maximum and minimum values relative to the reflectance of Examples 1 through 5 are summarised in Table 4; the corresponding values for the Comparative Example 1 through 4, in Table 5. Also, the standard deviation of the reflection spectra is indicated in each case. The analyses refer in each case to the spectral range from 400 nm to 680 nm.

TABLE 4

|  | Example 1 | Example 2 | Example 3 | Example 4 | Example 5 |
|---|---|---|---|---|---|
| Averaged reflectance relative to p-polarised radiation, 400 nm-680 nm | 17.6% | 19.9% | 20.2% | 16.6% | 22.3% |
| Difference between the maximally occurring reflectance and the mean | 1.8% | 1.7% | 2.0% | 1.1% | 1.6% |
| Difference between the minimally occurring reflectance and the mean | 1.1% | 0.7% | 1.5% | 0.9% | 1.3% |
| Standard deviation, 400 nm-680 nm | 0.55% | 0.48% | 0.60% | 0.27% | 0.62% |

TABLE 5

|  | Comparative Example 1 | Comparative Example 2 | Comparative Example 3 | Comparative Example 4 |
|---|---|---|---|---|
| Averaged reflectance relative to p-polarised radiation, 400 nm-680 nm | 17.6% | 19.8% | 23.1% | 22.0% |
| Difference between the maximally occurring reflectance and the mean | 4.2% | 3.6% | 5.1% | 5.8% |
| Difference between the minimally occurring reflectance and the mean | 1.4% | 1.6% | 2.2% | 2.3% |
| Standard deviation, 400 nm-680 nm | 1.49% | 1.11% | 2.52% | 2.70% |

In the case of the comparative examples, although relatively high averaged reflection values can also be achieved, the spectra in the relevant spectral range from 400 nm to 680 nm are subject to strong fluctuations, which can lead to undesirable colour shifts in the HUD image as well as to a poorer colour impression of the pane for the viewer. In contrast, the ratio of the optical thicknesses of the lower and upper dielectric layer/layer sequence of the Examples according to the invention causes a significant smoothing of the reflection spectrum, resulting in a more colour-neutral reproduction of the projector image and a more colour-neutral overall impression.

All of the panes had light transmittance greater than 70% such that they can be used as windshields.

Tests were also carried out with a windshield having green-coloured outer glass. The reflection coating was substantially the same as Example 1, wherein only the upper antireflection layer 23a was somewhat thinner (60 nm instead of 70 nm). The external reflection was significantly reduced (by 3-4% at observation angles of 8° and 60°, integral reflection).

LIST OF REFERENCE CHARACTERS

(10) windshield
(1) outer pane
(2) inner pane
(3) thermoplastic intermediate layer
(4) projector
(5) viewer/vehicle driver
(20) reflection coating
(21) electrically conductive layer
(22a) first lower dielectric layer/antireflection layer
(22b) second lower dielectric layer/matching layer
(22c) third lower dielectric layer/refractive index increasing layer
(23a) first upper dielectric layer/antireflection layer
(23b) second upper dielectric layer/matching layer
(23c) third upper dielectric layer/refractive index increasing layer
(24) metallic blocking layer
(O) upper edge of the windshield 10
(U) lower edge of the windshield 10
(B) HUD region of the windshield 10
(E) eye box
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:
1. Projection assembly for a head-up display (HUD), comprising:
 a windshield, comprising an outer pane and an inner pane that are joined to one another via a thermoplastic intermediate layer and having an HUD region (B); and
 a projector that is aimed at the HUD region;
 wherein
  a radiation of the projector is predominantly p-polarised, and
  the windshield is provided with a reflection coating that is suitable for reflecting p-polarised radiation;
 and wherein
  the reflection coating has exactly one electrically conductive layer based on silver,
  a lower dielectric layer or layer sequence whose refractive index is at least 1.9 is arranged beneath the electrically conductive layer, an upper dielectric layer or layer sequence whose refractive index is at least 1.9 is arranged above the electrically conductive layer, and a ratio of an optical thickness of the upper dielectric layer or layer sequence to an optical thickness of the lower dielectric layer or layer sequence is at least 1.7.

2. The projection assembly according to claim 1, wherein the ratio of the optical thickness of the upper dielectric layer or layer sequence to the optical thickness of the lower dielectric layer or layer sequence is at least 1.8, preferably at least 1.9.

3. The projection assembly according to claim 1, wherein the optical thickness of the upper dielectric layer or layer sequence is from 100 nm to 200 nm.

4. The projection assembly according to claim 1, wherein the optical thickness of the lower dielectric layer or layer sequence is from 50 nm to 100 nm.

5. The projection assembly according to claim 1, wherein the reflection coating does not include any dielectric layers whose refractive index is less than 1.9.

6. The projection assembly according to claim 1, wherein
exactly one lower dielectric layer with a refractive index of at least 1.9 is arranged beneath the electrically conductive layer, and/or
exactly one upper dielectric layer with a refractive index of at least 1.9 is arranged above the electrically conductive layer.

7. The projection assembly according to claim 1, wherein
a first lower dielectric layer and a second lower dielectric layer with a refractive index of at least 1.9, are arranged beneath the electrically conductive layer, and/or
a first upper dielectric layer and a second upper dielectric layer with a refractive index of at least 1.9, are arranged above the electrically conductive layer.

8. The projection assembly according to claim 1, wherein
a first lower dielectric layer, a second lower dielectric layer, and a third lower dielectric layer with a refractive index of at least 1.9 are arranged beneath the electrically conductive layer, and/or
a first upper dielectric layer, a second upper dielectric layer, and a third upper dielectric layer with a refractive index of at least 1.9, are arranged above the electrically conductive layer.

9. The projection assembly according to claim 1, wherein the reflection coating includes at least one metallic blocking layer that is arranged above and/or beneath the electrically conductive layer and has a geometric thickness of less than 1 nm.

10. The projection assembly according to claim 1, wherein the outer pane is tinted or coloured and has light transmittance of at least 80%.

11. The projection assembly according to claim 1, wherein the radiation of the projector is essentially purely p-polarised.

12. The projection assembly according to claim 1, wherein the radiation of the projector strikes the windshield with an angle of incidence of 60° to 70°.

13. The projection assembly according to claim 1, wherein the electrically conductive layer has a geometric thickness of 10 nm to 14 nm.

14. The projection assembly according to claim 1, wherein external surfaces of the windshield are arranged substantially parallel to one another.

15. The projection assembly according to claim 1, wherein the reflection coating is arranged on a surface of the outer pane or the inner pane facing the intermediate layer or within the intermediate layer.

16. The projection assembly according to claim 2, wherein the ratio of the optical thickness of the upper dielectric layer or layer sequence to the optical thickness of the lower dielectric layer or layer sequence is at least 1.9.

17. The projection assembly according to claim 3, wherein the optical thickness of the upper dielectric layer or layer sequence is from 130 nm to 170 nm.

18. The projection assembly according to claim 4, wherein the optical thickness of the lower dielectric layer or layer sequence is from 60 nm to 90 nm.

19. The projection assembly according to claim 6, wherein
the lower dielectric layer with a refractive index of at least 1.9 arranged beneath the electrically conductive layer is based on silicon nitride, and/or
the upper dielectric layer with a refractive index of at least 1.9 arranged above the electrically conductive layer is based on silicon nitride.

20. The projection assembly according to claim 7, wherein
the first lower dielectric layer is based on silicon nitride, and the second lower dielectric layer is based on zinc oxide, and/or
the first upper dielectric layer is based on silicon nitride, and the second upper dielectric layer is based on zinc oxide.

* * * * *